United States Patent
Minen

(10) Patent No.: US 11,322,039 B2
(45) Date of Patent: May 3, 2022

(54) APPARATUS TO SIMULATE DRIVING A MOTORCYCLE AND CORRESPONDING METHOD

(71) Applicant: VI-GRADE GMBH, Darmstadt (DE)

(72) Inventor: Diego Minen, Udine (IT)

(73) Assignee: VI-GRADE GMBH, Darmstadt (DE)

(*) Notice: Subject to any disclaimer, the term of this patent is extended or adjusted under 35 U.S.C. 154(b) by 0 days.

(21) Appl. No.: 17/040,748

(22) PCT Filed: May 30, 2019

(86) PCT No.: PCT/EP2019/064150
§ 371 (c)(1),
(2) Date: Sep. 23, 2020

(87) PCT Pub. No.: WO2019/229218
PCT Pub. Date: Dec. 5, 2019

(65) Prior Publication Data
US 2021/0020063 A1  Jan. 21, 2021

(30) Foreign Application Priority Data

May 30, 2018 (IT) .................. 102018000005864

(51) Int. Cl.
G09B 9/058 (2006.01)
B62H 1/00 (2006.01)

(52) U.S. Cl.
CPC .............. *G09B 9/058* (2013.01); *B62H 1/00* (2013.01)

(58) Field of Classification Search
CPC . G09B 9/058; G09B 9/02; G09B 9/04; G09B 9/042; B62H 1/00

USPC .......................................................... 434/61
See application file for complete search history.

(56) References Cited

U.S. PATENT DOCUMENTS

| | | | | |
|---|---|---|---|---|
| 3,686,776 A | * | 8/1972 | Dahl | G09B 9/058 434/61 |
| 5,006,072 A | * | 4/1991 | Letovsky | G09B 9/058 348/121 |
| 5,076,792 A | * | 12/1991 | Niermann | A63B 22/16 434/61 |
| 5,364,271 A | * | 11/1994 | Aknin | A63B 21/00181 434/61 |

(Continued)

FOREIGN PATENT DOCUMENTS

| | | |
|---|---|---|
| EP | 3176061 | 6/2017 |
| WO | 2018/055387 | 3/2018 |

OTHER PUBLICATIONS

Fereshteh Shahmiri et al.: "A Survey of Cable-Suspended Parallel Robots and their Applications in Architecture and Construction", Blucher Design Proceedings, Nov. 11, 2016 (Nov. 11, 2016), pp. 914-920, XP055527255, Sao Paulo, DOI: 10.5151/despro-sigradi2016-484 figure 10.

(Continued)

*Primary Examiner* — Jennifer E. Novosad
(74) *Attorney, Agent, or Firm* — Rankin, Hill & Clark LLP

(57) ABSTRACT

An apparatus to simulate driving a motorcycle includes a support base, a support body provided with a driving position on which a driver can take his place, and with command members configured to supply driving commands, a first movement unit connected to the support body and to the support base and configured to move the support body in space as a function of the driving signals.

10 Claims, 4 Drawing Sheets

(56) References Cited

U.S. PATENT DOCUMENTS

| | | | | |
|---|---|---|---|---|
| 5,547,382 | A * | 8/1996 | Yamasaki | G09B 9/05 |
| | | | | 273/442 |
| 6,210,165 | B1 * | 4/2001 | Sugimori | G09B 9/058 |
| | | | | 434/61 |
| 6,505,503 | B1 * | 1/2003 | Teresi | G09B 9/042 |
| | | | | 340/466 |
| 6,733,294 | B2 * | 5/2004 | Tuluie | G01M 17/0076 |
| | | | | 434/61 |
| 8,029,287 | B2 * | 10/2011 | Makuta | G09B 9/058 |
| | | | | 434/61 |
| 9,280,909 | B2 * | 3/2016 | Bober | G09B 9/058 |
| 9,396,667 | B1 * | 7/2016 | Bober | G09B 9/058 |
| 10,417,930 | B1 * | 9/2019 | Fraser | G09B 9/042 |
| 2003/0059744 | A1 | 3/2003 | Tuluie | |
| 2004/0077464 | A1 * | 4/2004 | Feldman | A63B 22/0007 |
| | | | | 482/57 |
| 2010/0035218 | A1 * | 2/2010 | Ichimi | G09B 9/058 |
| | | | | 434/61 |
| 2015/0279228 | A1 * | 10/2015 | Dericquebourg | G09B 9/042 |
| | | | | 434/61 |
| 2019/0311645 | A1 * | 10/2019 | Sawade | G09B 9/058 |
| 2021/0020063 | A1 * | 1/2021 | Minen | B62H 1/00 |

OTHER PUBLICATIONS

International Search Report filed in PCT/EP2019/064150 dated Jul. 18, 2019.
Notification of Transmittal of the IPRP daetd Jul. 21, 2020.

* cited by examiner

APPARATUS TO SIMULATE DRIVING A MOTORCYCLE AND CORRESPONDING METHOD

FIELD OF THE INVENTION

The present invention concerns an apparatus to simulate driving a motorcycle.

More specifically, the apparatus is provided with a position on which a driver of the motorcycle is subjected to different stresses suitable to simulate the real driving conditions of a motorcycle based on commands given by him, for example acceleration, deceleration, roll, pitch and yaw.

The present invention also concerns a method to simulate driving a motorcycle.

BACKGROUND OF THE INVENTION

Apparatuses to simulate driving a motorcycle are known, which comprise at least a support base, a support body associated with the support base and provided with a driving position on which a driver can take his place.

The support body is configured in manner substantially comparable to a motorcycle, that is, it can be defined by a motorcycle.

The support body is also provided with command members, for example throttle handles, gear levers, brake levers, steering handlebar, which allow to provide predefined actions to drive the motorcycle, such as acceleration, deceleration, roll, pitch and yaw.

Furthermore, known simulation apparatuses comprise a movement unit connected to the support body and to a control unit configured to drive the movement unit, in relation to driving commands given by the driver, and to simulate the real driving conditions for him.

The movement unit is usually defined by a hexapod structure which comprises a plurality of linear actuators connected with a first end thereof to the support base and with a second end thereof to the support body.

By suitably driving the linear actuators it is normally possible to determine only a rotation around three coordinated axes. It is therefore only possible to simulate the roll, pitch and yaw, albeit with considerable limits.

However, these traditional simulation apparatuses have considerable simulation limits, due in particular to the limited movements that they are able to impart on the support body and on the driver.

Furthermore, the movement unit of known solutions is not able to subject the driver to sufficient stresses suitable to provide a faithful simulation of driving a motorcycle.

Apparatuses to simulate driving a motorcycle are described, for example, in document WO 2018/055387. Document WO 2018/055387 describes an apparatus to simulate driving a motorcycle comprising another movement unit integral with the support body and configured to directly determine the driving stresses on the body of the driver. However, the forces applied by the second movement unit are dependent upon the movements of the support body, integral therewith, therefore the driving experience reproduced is not realistic. US 2003/059744 and EP 3.176.061 disclose other examples of simulators for two-wheels vehicles.

One purpose of the present invention is to provide an apparatus to simulate driving a motorcycle that allows to faithfully reproduce the stresses to which a driver is subjected while driving.

It is also a purpose of the present invention to provide a simulation apparatus which allows to increase the reproduction efficiency of tests on standard motorcycles.

It is also a purpose of the present invention to provide an apparatus which allows to widen the range of movements of the support body generated by the movement unit.

It is also a purpose of the present invention to provide a simulation apparatus which increases safety for the driver.

A further purpose of the present invention is to provide an apparatus to simulate driving a motorcycle which allows to increase the amount of time a driver is exposed to accelerations, and therefore provide a much more realistic simulation of the inertial environment to which the driver is subjected during driving.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the above purposes, an apparatus to simulate driving a motorcycle, according to the present invention, comprises:

a support base,
a support body provided with a driving position on which a driver can take his place, and with command members configured to supply driving commands, for example by means of levers and handles.
a first movement unit connected to the support body and to the support base and configured to move the support body in space as a function of the driving commands received.

According to one aspect of the invention, the simulation apparatus comprises a second movement unit connectable, during use, on one side to the driver to induce drive simulation stresses on the latter, and on the other side to the support base. The second movement unit comprises a device wearable by the driver, a plurality of cables connected to the wearable device, and a plurality of drive members associated with the support base and connected to the cables to move the wearable device in space as a function of the driving commands received.

The first movement unit comprises a plurality of linear actuators connected to the support body and to the support base and configured to be selectively lengthened and shortened to move the support body along three coordinate axes and to rotate the support body around one and/or another of the coordinate axes. The second movement unit is connected, during use, on one side to the driver to induce on the latter drive simulation stresses, and on the other side is integrally connected to said support base, said drive members being associated with said support base.

In this way it is possible to combine the actions imparted by the first movement unit and the second movement unit together, to provide a synergic combination of stresses that are perceived by the driver and increase the faithfulness of the motorcycle driving simulation.

In fact, the plurality of cables and the plurality of drive members work in synergy to combine the stresses to be induced on the driver and the motorcycle and faithfully reproduce the driving conditions of a motorcycle. In this regard, the present invention allows, for example, to simulate the accelerations of the driver in an extremely realistic way.

Furthermore, unlike traditional simulation apparatuses, the driver has the possibility of tilting the support body on which he is seated to a greater degree, since he is supported by the plurality of cables and therefore there is no risk of falling.

Furthermore, according to a possible embodiment, the support body is not attached to the support base, and this allows the support body to perform movements along a vertical axis.

Embodiments of the present invention also concern a method to simulate driving a motorcycle which provides that a driver sits on a driving position of a support body and, by means of command members, supplies driving commands to move the support body in space with respect to a support base by means of a first movement unit connected to the support body with respect to a support base.

According to one implementation of the invention, the method provides to induce on the driver drive simulation stresses by means of a second movement unit connected on one side to the driver, and on the other side integrally connected to the support base. The stresses are supplied by means of a wearable device of the second movement unit and worn by the driver, and by driving drive members associated with the support base and connected to cables which, in turn, are connected to the wearable device.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

With reference to the attached drawings, a simulation apparatus, according to the present invention is indicated as a whole with the reference number 10.

The simulation apparatus 10 comprises a support base 11 on which a support body 12 is located.

The support base 11 can have a substantially flat shape.

However, we do not exclude that the support base 11 has different shapes and sizes suitably designed in relation to the different components it has to support.

The support body 12 can have a conformation comparable to that of a motorcycle.

Figure 1:
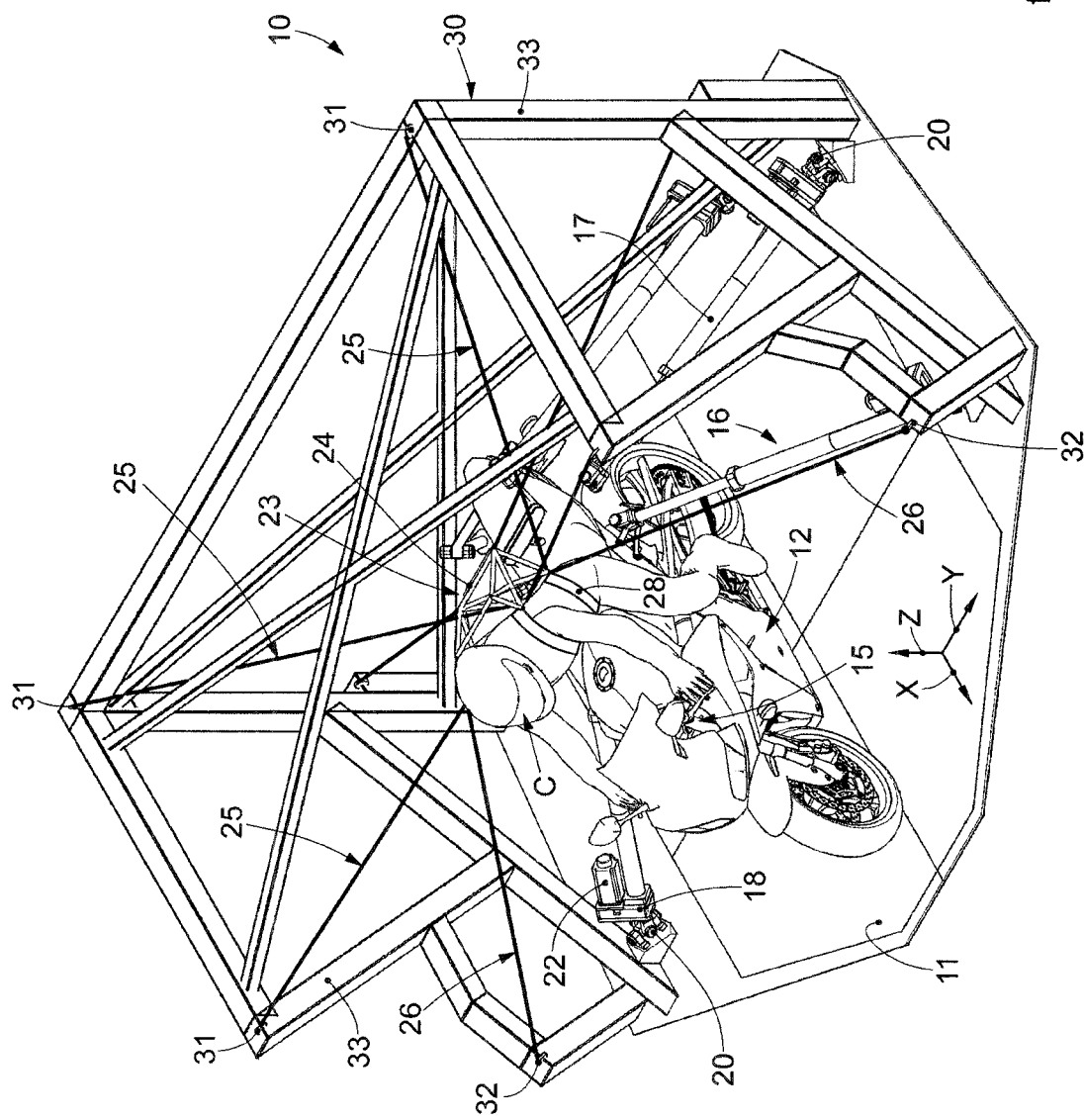
FIG. 1 is a perspective view of the simulation apparatus according to the present invention.
Figure 2:
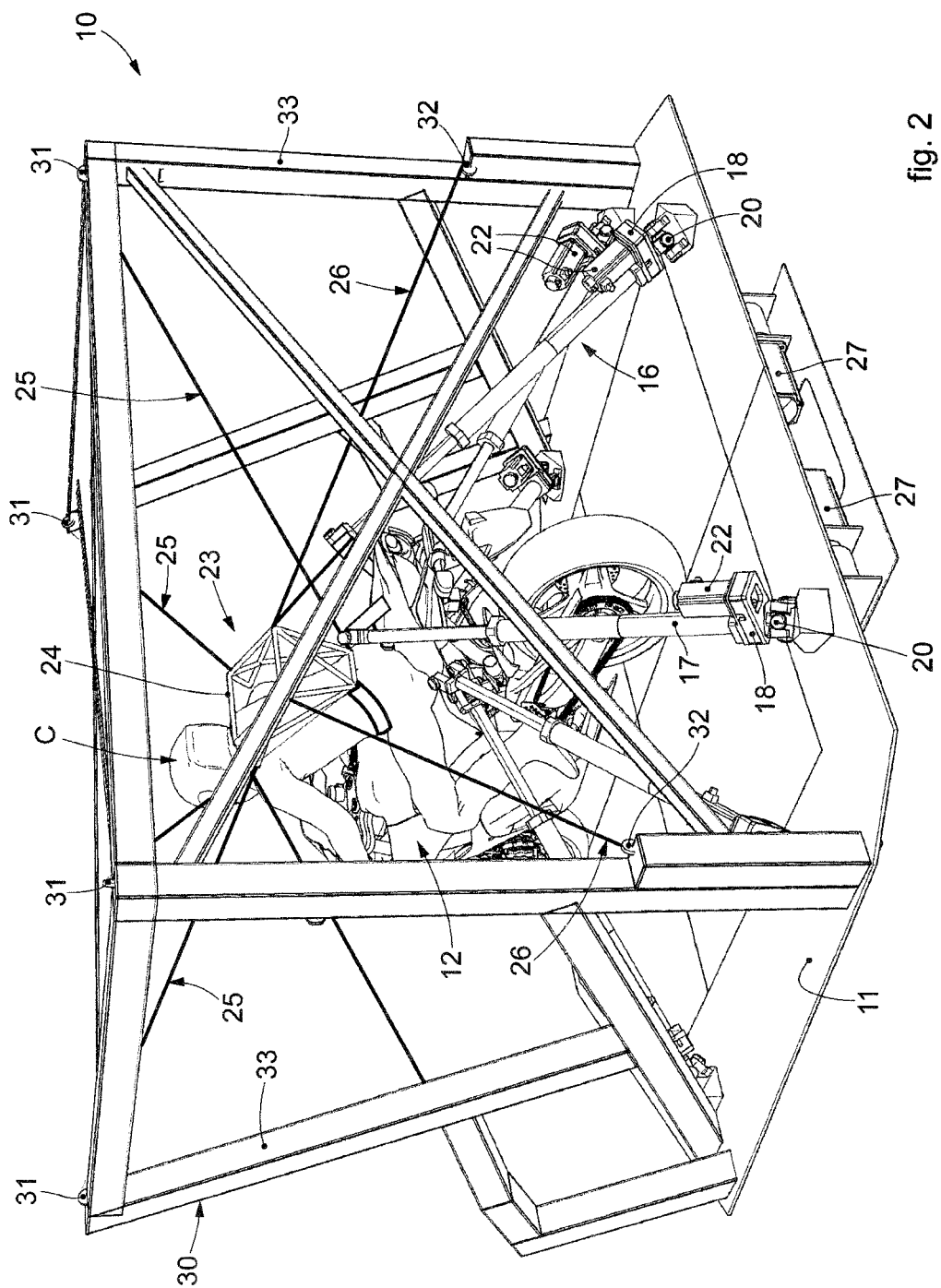
FIG. 2 is a rear perspective view of FIG. 1.
Figure 3:
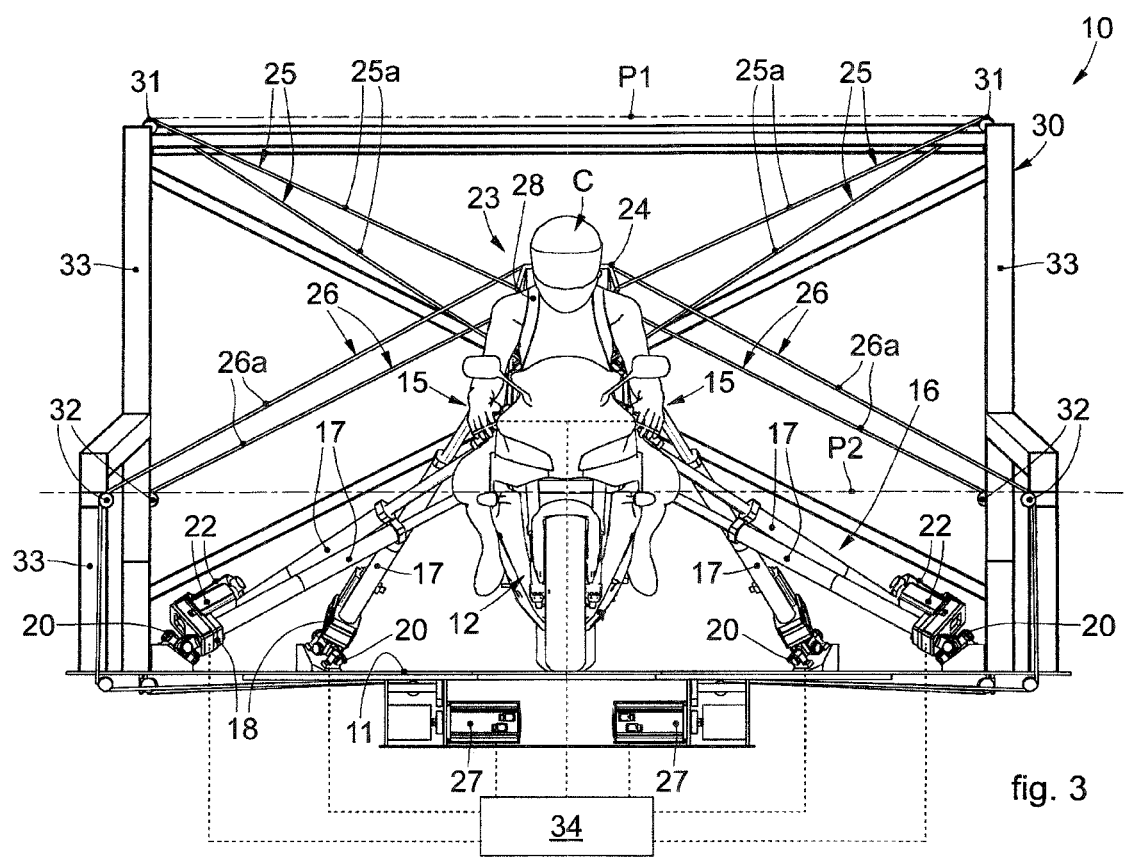
FIG. 3 is a front view of FIG. 1.
Figure 4:
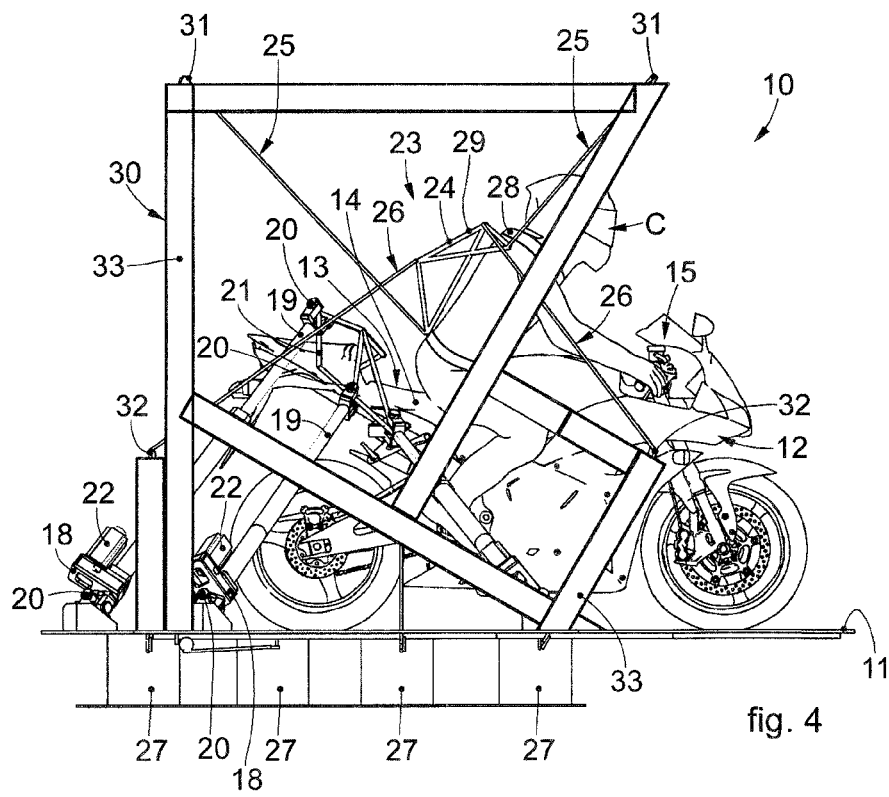
FIG. 4 is a lateral view of FIG. 3.
Figure 5:
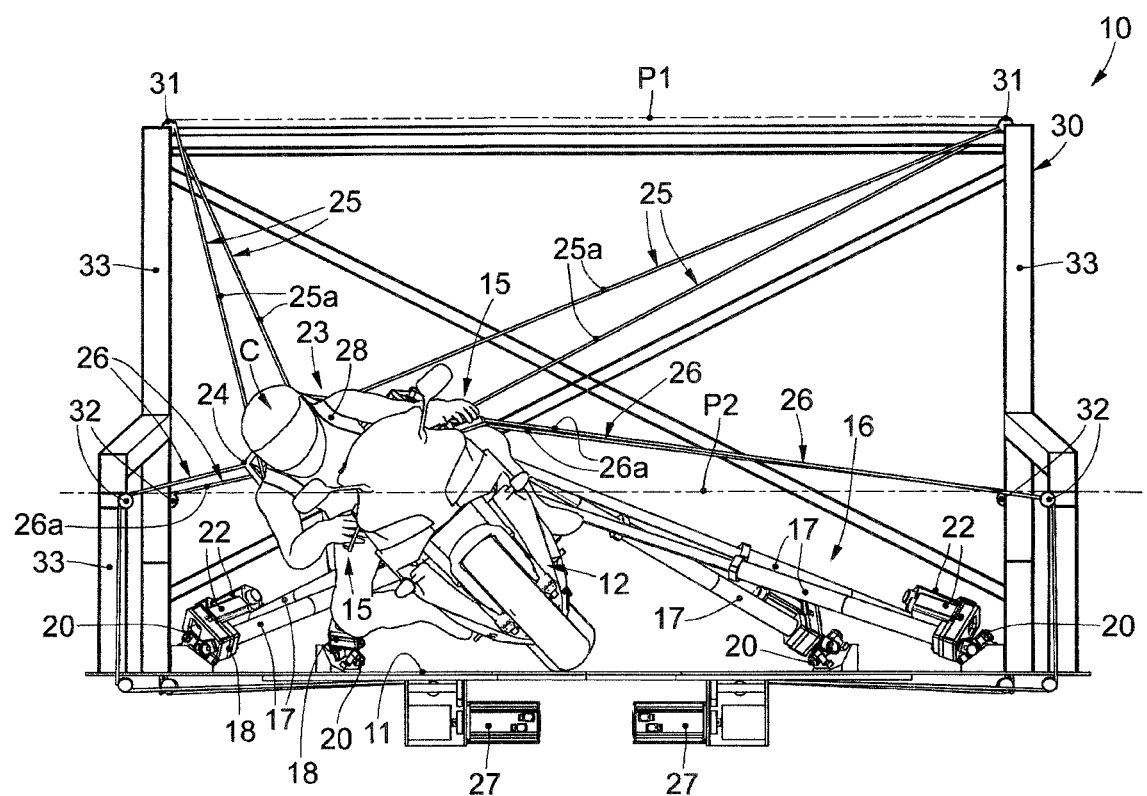
FIG. 5 is a view of the simulation apparatus of FIG. 3 in a different simulation condition.
Figure 6:
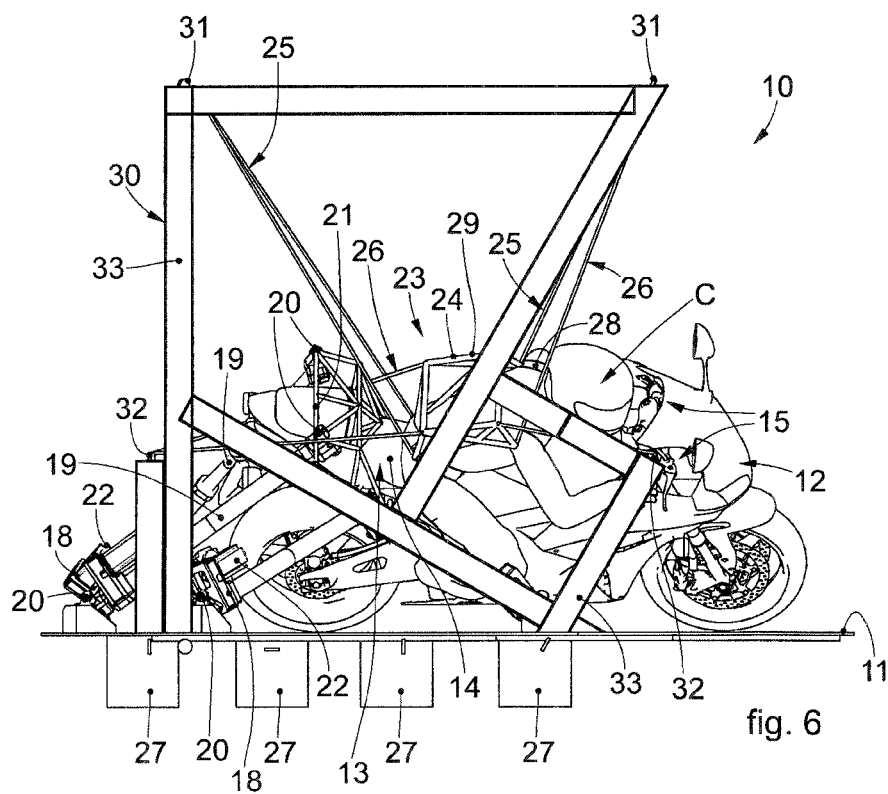
FIG. 6 is a lateral view of FIG. 5.

In some embodiments, for example shown in FIGS. 1-6, the support body 12 can be defined by a motorcycle.

According to one aspect of the present invention, the support body 12 is provided with a driving position 13 on which a driver C can sit.

The driving position 13 can be defined, for example, by a saddle 14. The support body 12 is also provided with command members 15 configured to provide driving commands of the motorcycle.

The driver C can act on the command members 15 so as to determine desired driving actions of the motorcycle.

The command members 15 can comprise one or more contact parts on which the driver can act, for example with his hands or feet, to impart the driving simulation commands.

By way of example only, the command members 15 can comprise at least one of either throttle handles, gear levers, brake levers, steering handlebar, pedals which allow to define predefined driving actions of the motorcycle.

Sensors can be associated with each of these contact parts, able to detect the actions that are required by the driver C and to convert the actions into signals, for example electric signals, to obtain simulations as described below.

By way of example only, the driving commands can be able to define information relating to the acceleration, deceleration, roll, pitch and yaw of the motorcycle and which the driver wants to simulate.

According to a further aspect of the present invention, the simulation apparatus 10 comprises a first movement unit 16 connected to the support body 12 and to the support base 11 and configured to move the support body 12 in space.

The first movement unit 16 can be configured to allow the translation of the support body 12 along three coordinated axes X, Y, and Z, and to allow the rotation of the support body 12 around one and/or the other of the coordinated axes X, Y and Z.

The translations and/or rotations around the coordinated axes X, Y, and Z can be combined with each other to move the support body 12 in space in any way, that is, in all its six degrees of freedom.

According to possible solutions, an example of which is shown in FIGS. 1-6, the first movement unit 16 can comprise an articulated hexapod configured to move the support body 12 in all its six degrees of freedom.

According to a possible solution, the first movement unit 16 can comprise a plurality of linear actuators 17 connected to the support body 12 and to the support base 11. The linear actuators 17 can comprise at least one of either a screw jack, a recirculating ball mechanism. The linear actuators 17 can be selectively lengthened and shortened to allow the movements of the support body 12.

According to possible solutions, each linear actuator 17 can be provided with its own electric motor 22 which can be selectively activated to determine the lengthening/shortening of the linear actuator itself. The use of electric motors 22 allows to precisely position the support body 12 in space.

According to a possible solution, the first movement unit 16 comprises six of the linear actuators 17. This number of actuators allows to move the support body 12 in all its six degrees of freedom.

According to a possible embodiment, a first group of the linear actuators 17, in this case three linear actuators 17, are disposed on one side of the support body 12, and a second group of the linear actuators 17, in this case the other three linear actuators 17, are disposed on the opposite side of the support body 12.

In particular, in at least one operating condition of the simulation apparatus, the first group of linear actuators 17 can be substantially symmetrical to the second group of actuators 17. This symmetry can be defined with respect to a longitudinal plane of the support body 12. This particular disposition allows to optimize the ranges, that is, the amplitudes of movement to which the linear actuators 17 can be subjected during use, thus also optimizing the respective entities of movement.

According to a possible solution, each linear actuator 17 comprises a first end 18 attached to the support base 11 and a second end 19 attached to the support body 12.

The second ends 19 of the linear actuators 17 are connected to the support body 12 at points distanced from each other. This allows to perform the movements of the support body 12 in all said directions, avoiding stress concentrations.

Furthermore, the second ends 19 are connected to the support body 12 in a position above the support base 11, that is, the second ends 19 are distanced with respect to the support base 11.

According to a possible solution, the first ends 18 and the second ends 19 are each provided with a respective joint 20, for example a spherical or universal joint, to allow the rotation, that is, the articulation, of the linear actuators 17 when they are driven.

According to a possible solution, the support body 12 is provided with a frame 21 to which the linear actuators 17 are connected.

In particular, it can be provided that the linear actuators 17 are connected with their second ends 19 to the frame 21.

The frame 21 can be installed in the rear part of the support body 12.

The frame 21 can be installed behind the driving position 13, so as to not interfere with the driver C during the movement of the linear actuators 17 themselves.

According to some embodiments of the invention, the linear actuators 17 can be provided with position detectors, not shown, provided to detect the length of the linear actuators 17. By combining the information received from each of the position detectors it is possible to determine on each occasion the instantaneous position of the support body 12 in space.

According to a further aspect of the present invention, the simulation apparatus 10 comprises a second movement unit 23 connectable, during use, on one side to the driver C to induce drive simulation stresses on the latter, and on the other side being integrally connected to the support base 11. By way of example only, the second movement unit 23 allows to move the driver C with respect to the driving position 13, that is, to induce on the driver C stresses suitable to simulate centrifugal or centripetal effects, or acceleration or deceleration actions of the motorcycle.

The combination of stresses that the driver perceives from the joint action of the first movement unit 16 and of the second movement unit 23 allows to immerse the driver in an inertial environment, making him perceive in a realistic manner the actual actions to which he would be subjected if he were actually driving a motorcycle.

According a further aspect of the invention, the second movement unit 23 comprises a device 24 wearable by the driver C, a plurality of cables 25, 26 connected to the wearable device 24, and a plurality of drive members 27 associated with the support base 11 and connected to the cables 25, 26 to move the wearable device 24, and therefore the driver, in space.

In particular, by appropriately coordinating the action of the cables on the driver, also in relation to the movements imparted by the first movement unit, it is possible to determine, for example, a forward, backward, or lateral movement of the driver C on the driving position 14, in order to simulate, for example, a deceleration, an acceleration, or the centrifugal/centripetal actions to which the driver C is subjected during a swerve.

The second movement unit 23 therefore allows to also induce tactile simulations on the driver C himself.

According to some embodiments, the simulation apparatus 10 can comprise at least a support structure 30 integrally attached to the support base 11, in which the second cables 25, 26 of the second movement unit 23 are connected on one side to the wearable device 24, and on the other side to the support structure 30.

Advantageously, therefore, the second movement unit 23 is not integral with the support body 12, as the cables 25, 26 are connected to the support structure 30, which is in turn attached to the support base 11 itself, on which the support body 12 can move. This allows to determine the forces to apply to the cables 25, 26 independently of the movements of the support body 12 on the support base 11. Advantageously, therefore, the forces are calculated and regulated only considering the data coming from the movements of the driver and from the virtual simulation. In this way, it is possible to separate the dynamic of the body of the driver C from the dynamic of the support body 12, providing a driving experience which is very realistic and faithful to the corresponding real experience. With respect to the simulation apparatuses known to the state of the art, therefore, the apparatus 10 is much more efficient and allows to reproduce the stresses to which the motorcycle and the driver are subjected during a real driving experience much more faithfully.

The cables 25, 26 can be made of steel, or of polymeric material.

The wearable device 24 can comprise, for example, a harness 28 to which first ends of the cables 25, 26 are attached.

The harness 28 can be defined by a plurality of straps which can be selectively attached to the torso of the driver C.

According to a possible solution, the wearable device 24 can comprise a connection element 29 attached to the harness 28 and positioned, during use, on the back of the driver C.

The ends of the cables 25, 26 are connected to the connection element 29 at different points distanced from each other. This allows to distribute the forces acting on the harness 28.

According to possible solutions of the invention, the first of these cables 25, hereafter first cables 25, comprise first segments 25a each having a first end attached to the wearable device 24 and a second end distanced and positioned above the support body 12.

According to some embodiments, the second ends of the first segments 25a lie on a first common lying plane P1 distanced from the support base 11 and located above the support body 12 and preferably during use, above the driver C. By way of example only, it can be provided that the first lying plane is distanced from the support body 12 by a distance of at least 0.5 m or more.

Furthermore, the second of these cables 26, hereafter second cables 26, comprise second segments 26a each also having a first end attached to the wearable device 24 and a second end distanced and located laterally to the support body 12.

According to a further embodiment of the invention, the second ends of the second segments 26a lie on a common second lying plane P2 distanced from the support base 11 and that intersects the support body 12.

In particular, it can be provided that the second ends of the first segments 25a and of the second segments 26a are located at the vertices of a polyhedron, for example of a parallelogram, which at least partially intersects the support body 12, and the vertices of which are located outside the latter.

This particular disposition of the second ends of the first segments 25a and of the second segments 26a allows to obtain an optimized positioning of the cables 25, 26 also in relation to the actions that they have to induce on the wearable device 24 and therefore on the driver C.

The first lying plane P1 and the second lying plane P2 are reciprocally distanced from one another and can possibly be parallel to each other.

The first lying plane P1 and the second lying plane P2 can be located parallel to the support base 11.

According to a possible solution, the second movement unit 23 comprises at least eight cables 25, 26 connected to the wearable device 24 that can be selectively driven by the drive members 27 in order to generate a tension on them. In particular, this number of cables allows to define a correct and precise positioning of the wearable device 24 in space.

In some embodiments of the invention, the second movement unit 23 comprises at least four of the first cables 25 and four of the second cables 26, their disposition as defined above allowing to obtain a precise control of the stresses that are induced on the driver C.

According to some embodiments, the support structure 30 comprises a plurality of return elements 31, 32 around which the cables 25, 26 are partially returned.

The support structure 30 can be defined by one or more support elements 33, attached to the support base 11, possibly connected to each other by crosspieces.

The return elements 31, 32 define between them at least two return segments of the cables 25, 26.

At least one of the return segments of each of the cables 25, 26 is interposed between the wearable device 24 and a respective one of the return elements 31, 32.

In particular, it can be provided that said first segments 25a and second segments 26a are interposed between the wearable device 24 and one of said return elements 31.

Specifically, it can be provided that the first segments 25a are partially wound around first ones of the return elements 31, while the second segments 26a are partially wound around second ones of the return elements 32.

Specifically, it can be provided that the first return elements 31 are located according to the disposition described above for the second ends of the first segments 25a of the first cables 25, while the second return elements 32 are located according to the disposition described above for the second ends of the second segments 26a of the second cables 26.

The drive members 27 are connected to the cables 25 and 26 and generate a tension therein. The combined action of tensioning the cables 25, 26 allows to define a predefined positioning of the wearable device 24 in space.

The drive members 27 can each comprise at least an electric motor and a drum which can be selectively rotated by the electric motor and on which the cable 25, 26 is wound/unwound.

According to a possible embodiment, each cable 25, 26 is connected to its own drive member 27 thus allowing an optimal control of the tension acting on each cable 25, 26.

According to a possible embodiment, not shown, the drive members 27 can be disposed in correspondence with the second ends of the first segments 25a and of the second segments 26a of the cables 25, 26.

According to a variant embodiment, shown in FIGS. 1-6, the drive members 27 can be positioned under the support base 11, and the cables 25, 26 are diverted toward the latter by means of the return elements 31, 32 and/or other return elements.

According to a possible embodiment of the invention, the drive members 27 can each comprise a detection device provided to detect at least one of either the tension and/or the position of the end of the cables 25, 26 connected to the wearable device 24. In particular, it can be provided that the detection device is able to know the length of the respective cable 25, 26 which is comprised between the wearable device 24 and the drive member 27. By suitably combining the data relating to the cables 25, 26 it is possible to unambiguously determine the position of the wearable device 24, and therefore of the driver C, in space.

According to one embodiment of the invention, the simulation apparatus 10 comprises a control and command unit 34 configured to drive the first movement unit 16 and the second movement unit 23 in relation to the driving commands received from the command members 15, that is, determined by the driver C on the command members 15.

The control and command unit 34, in particular, can be connected at least to the first movement unit 16, to the command members 15 on which the driver C acts, and to the drive members 27. In this way, when the driver C acts on one of the command members 15 to simulate a desired driving action, the first movement unit 16 modifies the position of the support body 12, simulating the movement that the motorcycle is subjected to due to the desired driving action, while the second movement unit 23 interacts directly on the driver C to subject him to the inertial stresses to which he would be subjected, if he were actually driving a motorcycle. The drive of the second movement unit 23 is therefore strongly influenced by the movement which is induced by the first movement unit 16.

According to possible solutions, the control and command unit 34 is configured to also receive the data detected by the sensors connected to the contact parts of the command members 15, thus obtaining electric signals corresponding to the actions that the driver C wants to simulate.

According to a possible embodiment, the control and command unit 34 is also connected to the detectors that detect the position of the linear actuators 17, and to the devices that detect the drive members 27 whose data, when suitably combined, allows to instantaneously determine the position of the support body 12 and of the wearable device 24 in space, in order to correlate them with specific driving conditions, shown for example in FIGS. 3-6.

The control and command unit 34 can comprise and implement a coupling algorithm able to manage, in real time, at least the movements induced on the support body 12 and the movements induced on the wearable device 23 by coordinating the actuation of the first and of the second movement unit.

It is clear that modifications and/or additions of parts may be made to the simulation apparatus 10 as described heretofore, without departing from the field and scope of the present invention.

For example, it is possible for the support base 11 to be provided with a coupling element, suitable to connect the simulation apparatus 10 of the present invention to a movement device. In this way, the simulation apparatus can be moved along a plane defined by the movement device, thus allowing to produce additional dynamic stresses during the simulations. Possible movement devices suitable for this purpose are described by patents WO 2017/021323 and WO 2013/114179.

It is also clear that, although the present invention has been described with reference to some specific examples, a person of skill in the art shall certainly be able to achieve many other equivalent forms of simulation apparatuses 10, having the characteristics as set forth in the claims and hence all coming within the field of protection defined thereby.

In the following claims, the sole purpose of any references in parentheses is to facilitate reading: they must not be considered as restrictive factors with regard to the field of protection claimed in the specific claims.

The invention claimed is:

1. An apparatus to simulate driving a motorcycle comprising:
   a support base;
   a support body provided with a driving position on which a driver can take his place, and with command members configured to supply driving commands;
   a first movement unit connected to the support body and to the support base and configured to move said support body in space as a function of said driving commands; and
   a second movement unit comprising a device wearable by said driver, a plurality of cables connected to said wearable device, and a plurality of drive members connected to said cables to move said wearable device in space as a function of the driving commands,
   wherein said first movement unit comprises a plurality of linear actuators connected to the support body and to the support base, and configured to be selectively lengthened and shortened to move the support body along three coordinate axes and to rotate the support body around one and/or another of the coordinate axes, and wherein said second movement unit is connected, during use, on one side to the driver, to induce on the driver, drive simulation stresses, and on the other side is connected to said support base, said drive members being associated with said support base.

2. The apparatus as in claim 1, further comprising a control and command unit configured to drive the first movement unit and the second movement unit in relation to the driving commands received by said command members.

3. The apparatus as in claim 1, wherein the second movement unit comprises at least eight cables.

4. The apparatus as in claim 1, wherein first cables of the plurality of cables comprise first segments each having a first end attached to the wearable device and a second end, distanced and positioned above the support body, and in that second cables of the plurality of cables comprise second segments each having a first end attached to the wearable device and a second end, distanced and located laterally to the support body.

5. The apparatus as in claim 4, wherein the second ends of the first segments lie on a first common lying plane distanced from the support base and located above the support body, and in that the second ends of the second segments lie on a second common lying plane distanced from the support base and that intersects the support body.

6. The apparatus as in claim 4, wherein the second movement unit comprises at least four of said first cables and four of said second cables.

7. The apparatus as in claim 1, wherein the first movement unit comprises an articulated hexapod.

8. The apparatus as in claim 1, further comprising a support structure integrally attached on said support base, said plurality of cables of said second movement unit being connected on one side to said wearable device and on the other side to said support structure.

9. The apparatus as in claim 8, further comprising a plurality of return elements associated with said support structure, said plurality of cables being partially returned around said return elements, said support structure being defined by one or more support elements connected to each other by crosspieces, and attached to said support base.

10. A method to simulate driving a motorcycle which provides that a driver sits on a driving position of a support body and, by means of command members, supplies driving commands to move said support body in space with respect to a support base by means of a first movement unit connected to the support body and to the support base, said method comprises inducing on said driver, drive simulation stresses, by means of a second movement unit, said stresses being supplied by means of a wearable device of said second movement unit and worn by said driver and by driving drive members connected to a plurality of first and second cables, said first and second cables in turn being connected to said wearable device;
   providing, by means of said first movement unit, comprising a plurality of linear actuators connected to the support body and to the support base, a movement of the support body along three coordinate axes and a rotation of the support body around one and/or another of the coordinate axes, and
   providing, by means of said second movement unit, connected on one side to said driver and on the other side connected to said support base, said drive members being associated with said support base, said drive simulation stresses to be induced on the driver.

* * * * *